(12) United States Patent
Blasco et al.

(10) Patent No.: US 10,901,484 B2
(45) Date of Patent: Jan. 26, 2021

(54) FETCH PREDITION CIRCUIT FOR REDUCING POWER CONSUMPTION IN A PROCESSOR

(71) Applicant: Apple Inc., Cupertino, CA (US)

(72) Inventors: Conrado Blasco, Sunnyvale, CA (US); Ronald P. Hall, Austin, TX (US); Ramesh B. Gunna, San Jose, CA (US); Ian D. Kountanis, Santa Clara, CA (US); Shyam Sundar, Sunnyvale, CA (US); André Seznec, Acigné (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/363,517

(22) Filed: Mar. 25, 2019

(65) Prior Publication Data
US 2019/0286218 A1    Sep. 19, 2019

Related U.S. Application Data

(63) Continuation of application No. 14/104,042, filed on Dec. 12, 2013, now Pat. No. 10,241,557.

(51) Int. Cl.
*G06F 9/38*  (2018.01)
*G06F 1/3237*  (2019.01)
*G06F 1/324*  (2019.01)
*G06F 1/3234*  (2019.01)
*G06F 1/3296*  (2019.01)

(52) U.S. Cl.
CPC ............ *G06F 1/3237* (2013.01); *G06F 1/324* (2013.01); *G06F 1/3275* (2013.01); *G06F 1/3296* (2013.01); *G06F 9/3802* (2013.01); *G06F 9/3806* (2013.01); *Y02D 10/00* (2018.01)

(58) Field of Classification Search
CPC .............................. G06F 9/3802; G06F 9/3806
See application file for complete search history.

(56) References Cited

U.S. PATENT DOCUMENTS

| 6,598,152 | B1 | 7/2003 | Sinharoy |
| 6,678,815 | B1 * | 1/2004 | Mathews ............ G06F 12/0882 711/205 |
| 7,076,635 | B1 * | 7/2006 | Butler ................. G06F 12/0862 711/205 |
| 7,609,582 | B2 | 10/2009 | Park |
| 7,681,021 | B2 | 3/2010 | Schuler et al. |
| 7,925,853 | B2 | 4/2011 | Gschwind et al. |
| 2004/0181654 | A1 | 9/2004 | Chen |

(Continued)

FOREIGN PATENT DOCUMENTS

WO    2013/101152    7/2013

*Primary Examiner* — Michael J Metzger
(74) *Attorney, Agent, or Firm* — Kowert, Hood, Munyon, Rankin & Goetzel, P.C.

(57) ABSTRACT

A processor includes a mechanism for disabling a memory array of a branch prediction unit. The processor may include a next fetch prediction unit that may include a number of entries. Each entry may correspond to a next instruction fetch group and may store an indication of whether or not the corresponding the next fetch group includes a conditional branch instruction. In response to an indication that the next fetch group does not include a conditional branch instruction, the fetch prediction unit may be configured to disable, in a next instruction execution cycle, the memory array of the branch prediction unit.

20 Claims, 7 Drawing Sheets

(56) References Cited

U.S. PATENT DOCUMENTS

| | | | |
|---|---|---|---|
| 2008/0082753 A1* | 4/2008 | Licht | G06F 1/3275 711/128 |
| 2009/0249036 A1* | 10/2009 | Rappoport | G06F 1/3203 712/220 |
| 2010/0169625 A1 | 7/2010 | Wang et al. | |
| 2011/0078425 A1 | 3/2011 | Shah et al. | |
| 2012/0311308 A1 | 12/2012 | Xekalakis et al. | |
| 2013/0290676 A1 | 10/2013 | Aggarwal et al. | |

* cited by examiner ns
FETCH PREDITION CIRCUIT FOR REDUCING POWER CONSUMPTION IN A PROCESSOR The present application is a continuation of U.S. application Ser. No. 14/104,042, filed Dec. 12, 2013 (now U.S. Pat. No. 10,241,557); the disclosure of which is incorporated by reference herein in its entirety.

BACKGROUND

Technical Field

This disclosure relates to processor operation, and more particularly to reducing power consumption associated with various memory arrays of the processor.

Description of the Related Art

Modern processors have become increasingly more capable of performing difficult tasks, and in shorter times. In most applications, processor performance is a driving force behind system design. However, along with the increased capability has come a concomitant increase in power consumption. In many systems, excess power consumption is problematic. For example in battery operated systems such as those found in mobile wireless and computing devices, excess power consumption directly contributes to shorter battery life. In the consumer electronics market, a short battery life can be a game changer for sales. In other contexts, excess processor power consumption may also be unacceptable. For example, server systems that employ numerous processors or processor cores per server, and many hundreds and thousands of servers such as may be found in a large data center may be sensitive to power consumption. More particularly, more power consumption means a bigger carbon footprint, more cooling requirements, more direct power costs, and the like. Accordingly, integrated circuit designers continually strive to find ways of reducing power consumption.

SUMMARY OF THE EMBODIMENTS

Various embodiments of power reduction mechanisms of a processor are disclosed. Broadly speaking, a processor includes a branch prediction unit including a memory array for storing conditional branch prediction information. The processor may also include a next fetch prediction unit that may include a number of entries. Each entry may correspond to a next instruction fetch group and may store an indication of whether or not the corresponding the next fetch group includes a conditional branch instruction. In response to an indication that the next fetch group does not include a conditional branch instruction, the fetch prediction unit may be configured to disable, in a next instruction execution cycle, the memory array of the branch prediction unit.

Figure 1:
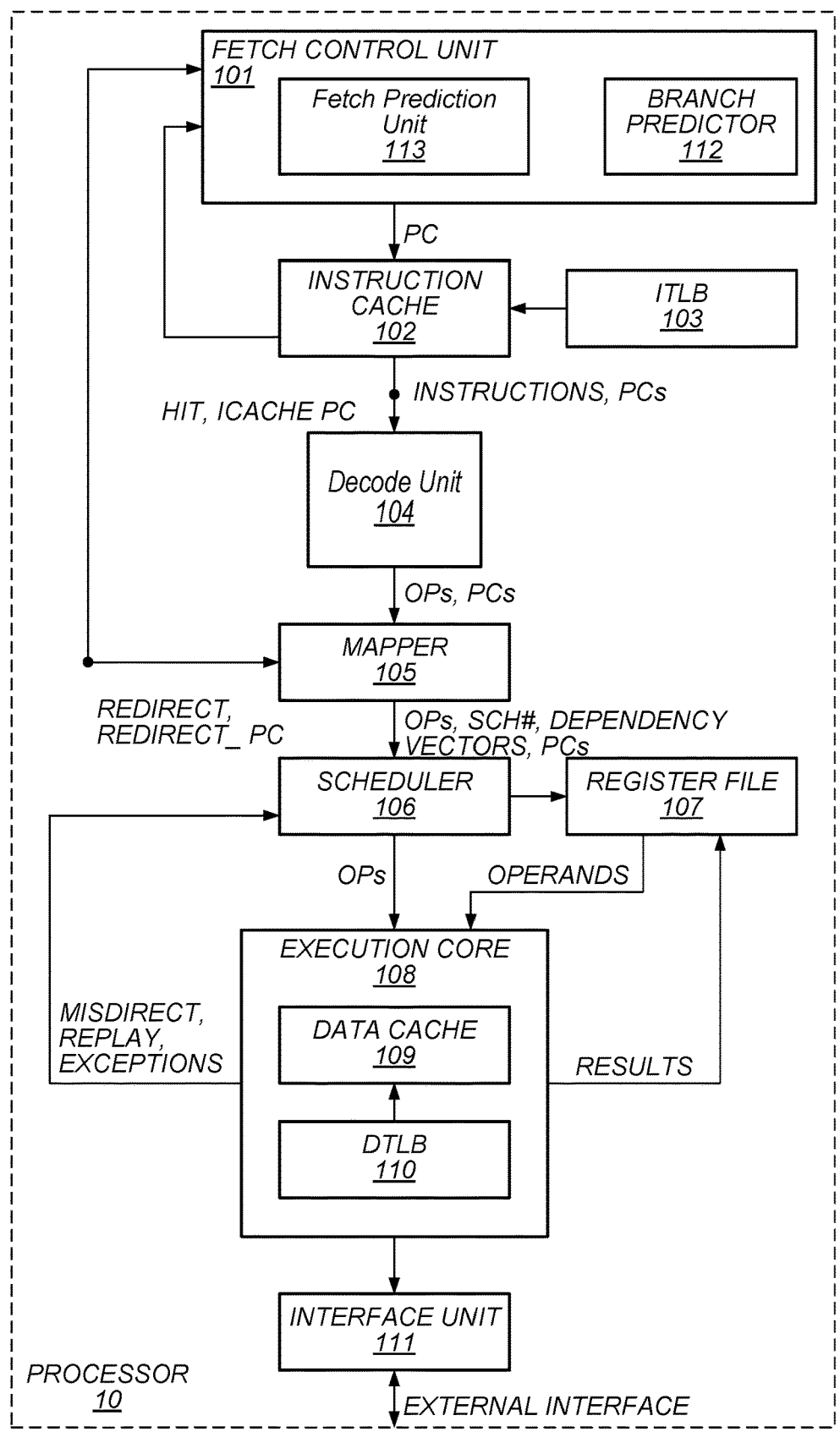
FIG. 1 is a block diagram of one embodiment of a processor.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Processor Overview

Turning now to FIG. 1, a block diagram of one embodiment of a processor is shown. The processor 101 includes a fetch control unit 101, an instruction cache 102, a decode unit 104, a mapper 105, a scheduler 106, a register file 107, an execution core 108, and an interface unit 111. The fetch control unit 101 is coupled to provide a program counter address (PC) for fetching instructions to the instruction cache 102. The instruction cache 102 is coupled to provide instructions (with PCs) to the decode unit 104, which is coupled to provide decoded instruction operations (ops, again with PCs) to the mapper 105. The instruction cache 102 may also be configured to provide a hit indication and to generate instruction data as an output in response to a PC input. The mapper 105 is coupled to the scheduler 106 and to the fetch control unit 101. The scheduler 106 is coupled to the register file 107 and to the execution core 108. The register file is coupled to the execution core 108. The execution core 108 is coupled to the interface unit 111, which is further coupled to an external interface of the processor 200.

Fetch control unit 101 may be configured to generate fetch PCs for instruction cache 102. In some embodiments, fetch control unit 101 may include one or more types of branch predictors (e.g., branch predictors 112 and fetch prediction unit 113). For example, fetch control unit 101 may include indirect branch target predictors configured to predict the target address for indirect branch instructions, conditional branch predictors configured to predict the outcome of conditional branches, and/or any other suitable type of branch predictor. More particularly, as described in more detail below, fetch prediction unit 113 may include a fast access next fetch prediction unit (201 of FIG. 2) and a sequential fetch prediction unit (203 of FIG. 2). During operation, fetch control unit 101 may generate a fetch PC based on the output of a selected branch predictor. If the prediction later turns out to be incorrect, fetch control unit 101 may be redirected to fetch from a different address, and the fetch pipeline may be flushed.

Figure 5:
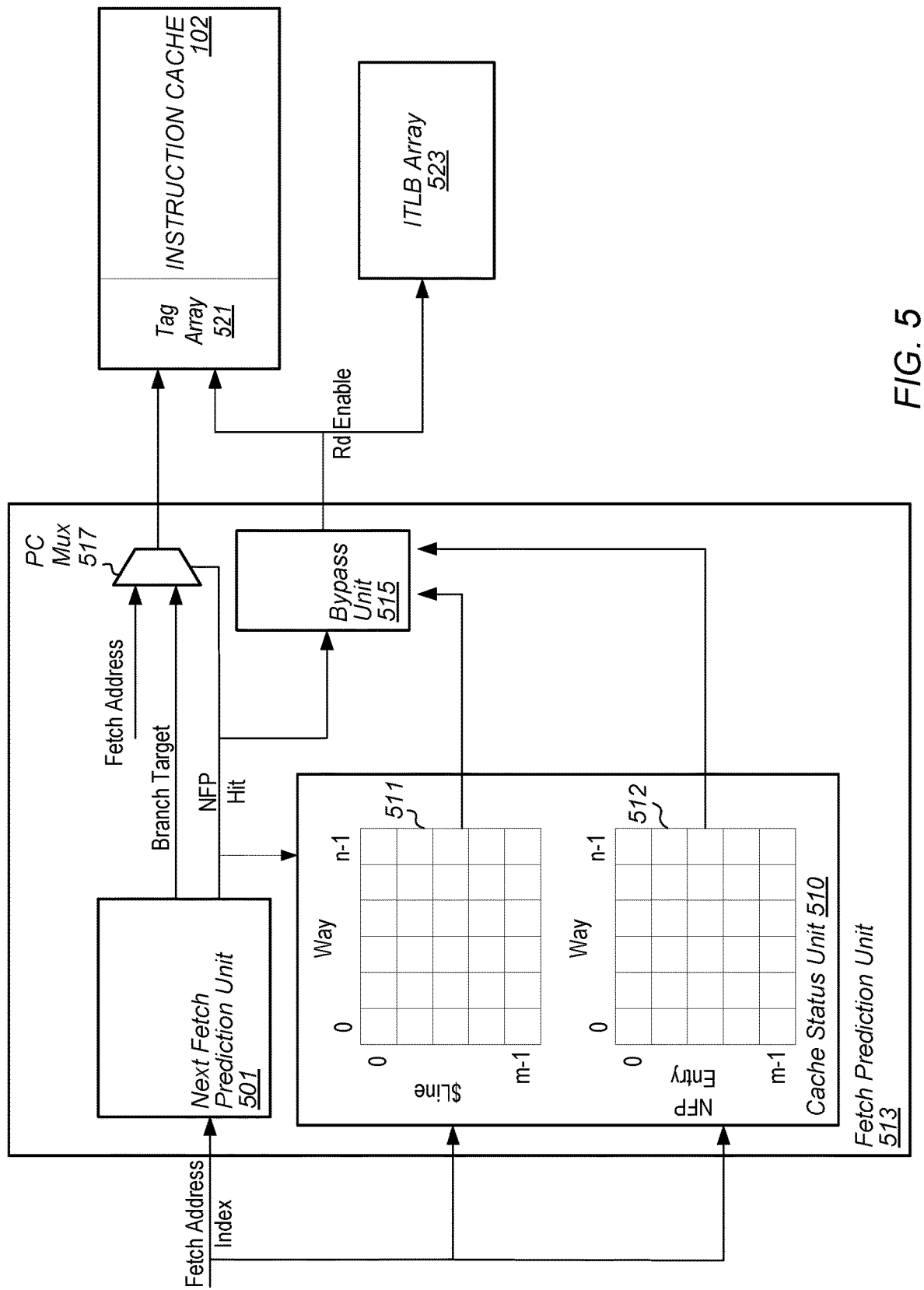
FIG. 5 is a block diagram depicting more detailed aspects of another embodiment of the processor of FIG. 1.

The instruction cache 102 may be a cache memory for storing instructions to be executed by the processor 10. In various embodiments, the instruction cache 102 may have any capacity and construction (e.g. direct mapped, set associative, fully associative, etc.). The instruction cache 102 may have any cache line size. For example, 64-byte cache lines may be implemented in one embodiment. Other embodiments may use larger or smaller cache line sizes. In response to a given PC from the fetch control unit 101, the instruction cache 102 may output up to a maximum number of instructions. It is contemplated that processor 10 may implement any suitable instruction set architecture (ISA), such as, e.g., the ARM™, PowerPC™, or x86 ISAs, or combinations thereof. In one particular implementation, the instruction cache 102 is a set associate cache that includes a number of independently configurable ways. For example, in one embodiment, the instruction cache 102 may be implemented as a 4-*way* set associative cache. As shown in FIG. 5, and described below, the instruction cache 102 may include a tag array, used for indexing into the instruction cache 102 main data storage array.

In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 102 may use virtual address bits for cache indexing and physical address bits for cache tags.

To avoid the cost of performing a full memory translation when performing a cache access, processor 10 may store a set of recent and/or frequently-used virtual-to-physical address translations in a translation lookaside buffer (TLB), such as Instruction TLB (ITLB) 103. During operation, ITLB 103 (which may be implemented as a cache memory array, as a content addressable memory (CAM), or using any other suitable circuit structure) may receive virtual address information and determine whether a valid translation is present. If so, ITLB 103 may provide the corresponding physical address bits to instruction cache 102. If not, ITLB 103 may cause the translation to be determined, for example by raising a virtual memory exception.

As described further below in conjunction with the descriptions of FIG. 2 through FIG. 6, each of the branch direction predictor and the indirect branch predictor of the branch predictor 112, the instruction cache 102, and the ITLB 103 may include one or more respective memory arrays that may be enabled and disabled independently to reduce power consumption. More particularly, when certain instruction sequences occur repetitively such as in a code loop that includes branch instructions, it may be possible to identify whether or not a branch instruction is present in a next fetch group, and in any sequential fetch groups after a taken branch instruction. If there is no conditional branch instructions present, the respective branch prediction arrays may be disabled (or powered down), thereby saving power. Similarly, if the instruction cache 102 or the ITLB 103 is not accessed, the corresponding tag or memory arrays may be disabled. Accordingly, in one embodiment disabling a particular memory array may refer to power gating or otherwise disconnecting or reducing a supply voltage from one or more circuits (such as sense amplifiers, output drivers, memory cells, for example) within the array(s). In another embodiment, disabling a particular array may refer to gating or disabling any clocking of one or more circuits within the particular array, or in other embodiments, simply disabling or inhibiting the read enable signals to the arrays.

The decode unit 104 may generally be configured to decode the instructions into instruction operations (ops). As used herein, the terms micro-operations (micro-ops) and ops may be used interchangeably. Generally, an instruction operation may be an operation that the hardware included in the execution core 108 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 104 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 104 and mapper 105 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Operations generated by the decode unit 104 may be provided to the mapper 105. The mapper 105 may provide the ops along with any dependency information to the scheduler 106. In one embodiment, the mapper 205 may implement register renaming to map source register addresses from the ops to the source operand numbers (SO#s) identifying the renamed source registers. Additionally, the mapper 105 may be configured to assign a scheduler entry to store each op, identified by the SCH#. In an embodiment, the SCH# may also be configured to identify the rename register assigned to the destination of the op. In other embodiments, the mapper 105 may be configured to assign a separate destination register number. Additionally, in one embodiment, the mapper 105 may be configured to generate dependency information for the ops.

The scheduler 106 may be configured to store the ops in the scheduler entries identified by the respective SCH#s, along with the SO#s and PCs. The scheduler may be configured to store the dependency information in dependency arrays that evaluate which ops are eligible for scheduling. The scheduler 106 may be configured to schedule the ops for execution in the execution core 108. When an op is scheduled, the scheduler 106 may be configured to read its source operands from the register file 107 and the source operands may be provided to the execution core 108. The execution core 108 may be configured to return the results of ops that update registers to the register file 107. In some cases, the execution core 108 may forward a result that is to be written to the register file 107 in place of the value read from the register file 107 (e.g. in the case of back to back scheduling of dependent ops).

The execution core 108 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 108 may be configured to execute predicted branch ops, and may receive the predicted target address that was originally provided to the fetch control unit 101. The execution core 108 may be configured to calculate the target address from the operands of the branch op, and to compare the calculated target address to the predicted target address to detect correct prediction or misprediction. The execution core 108 may also evaluate any other prediction made with respect to the branch op, such as a prediction of the branch op's direction. If a misprediction is detected, execution core 108 may signal that fetch control unit 101 should be redirected to the correct fetch target. As described further below, the way prediction unit 113 may be trained during the redirection process. Other units, such as the scheduler 106, the mapper 105, and the decode unit 104 may flush pending ops/instructions from the speculative instruction stream that are subsequent to or dependent upon the mispredicted branch.

As shown, the execution core 108 may include a data cache 109, which may be a cache memory for storing data to be processed by the processor 10. Like the instruction cache 102, the data cache 109 may have any suitable capacity, construction, or line size (e.g. direct mapped, set associative, fully associative, etc.). Moreover, the data cache 109 may differ from the instruction cache 102 in any of these details. As with instruction cache 102, in some embodiments, data cache 109 may be partially or entirely addressed using physical address bits. Correspondingly, a data TLB (DTLB) 110 may be provided to cache virtual-to-physical address translations for use in accessing the data cache 109 in a manner similar to that described above with respect to ITLB 103. It is noted that although ITLB 103 and DTLB 110 may perform similar functions, in various embodiments they may be implemented differently. For example, they may store different numbers of translations and/or different translation information.

The register file 107 may generally include any set of registers usable to store operands and results of ops executed in the processor 10. In some embodiments, the register file 107 may include a set of physical registers and the mapper 105 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 107 may include an architected register set containing the committed state of the logical registers and a speculative register set containing speculative register state.

The interface unit 111 may generally include the circuitry for interfacing the processor 10 to other devices such as a system memory (not shown in FIG. 1), for example, on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

Branch Prediction Power Reduction

Figure 2:
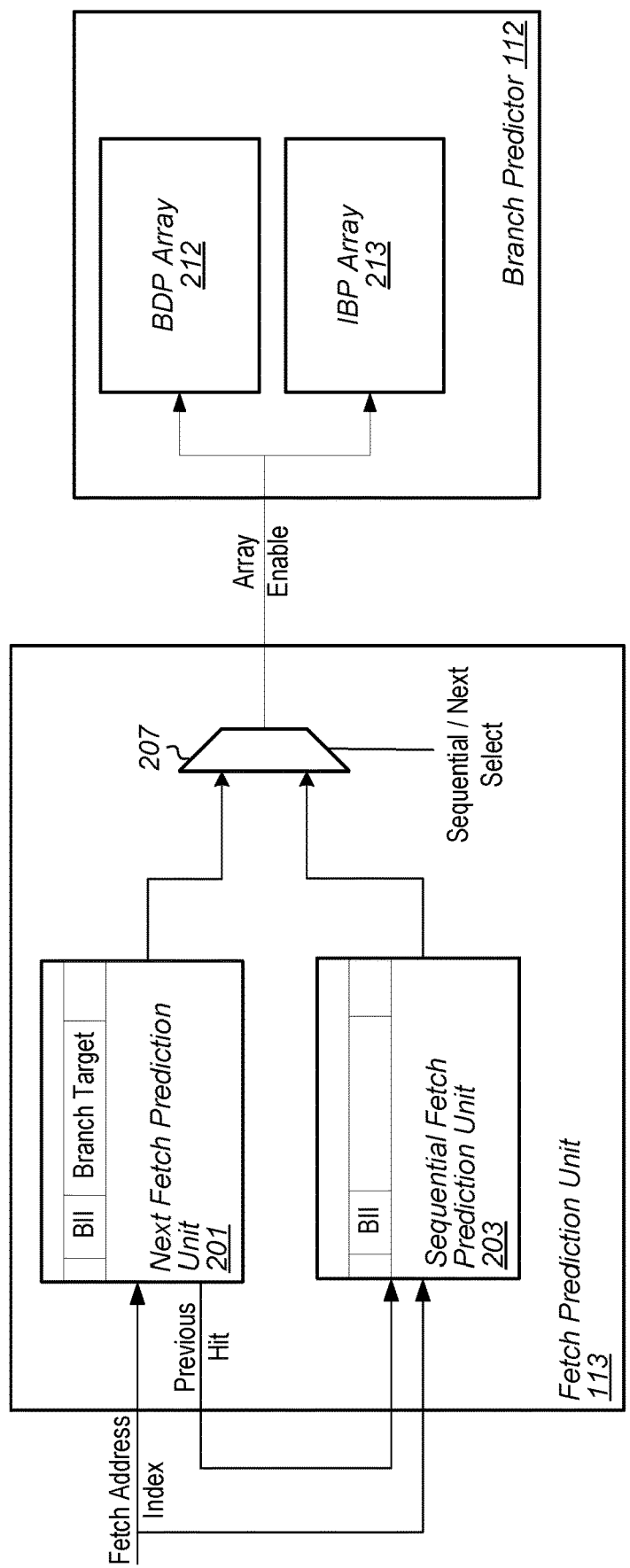
FIG. 2 is a block diagram depicting more detailed aspects of one embodiment of the processor of FIG. 1.

Referring to FIG. 2, a block diagram illustrating more detailed aspects of the processor of FIG. 1 is shown. It is noted that components that correspond to those shown in FIG. 1 are numbered identically for clarity and simplicity. As mentioned above, and shown in FIG. 2, the processor 10 includes a fetch prediction unit 113, which includes a next fetch prediction unit 201 and a sequential fetch prediction unit 203, both of which are coupled through a multiplexer 207 to the branch direction predictor (BDP) array 212 and the indirect branch predictor (IBP) array 213 of the branch predictor 112.

As mentioned above, if there is no conditional branch instruction present in a fetch group, then no branch prediction will be necessary for that fetch group. Thus, the branch prediction arrays may be disabled (or powered down), thereby saving power.

Accordingly, in one embodiment, the next fetch prediction unit 201 may be configured to perform simple branch direction and target prediction. The next fetch prediction unit 201 may include a number of indexed entries. Accordingly, the next fetch prediction unit 201 may store, in each entry, branch target information that is indexed and tagged by the fetch address. A hit/miss indication represents the taken/not taken prediction, and the output of a storage array (not shown) within the next fetch prediction unit 201 represents the predicted target for the case of a hit. In the case of a miss, the fetch control unit 101 may continue fetching on the sequential path. In one embodiment, the next fetch prediction unit 201 may be trained using the information that drives the redirection process during, for example, a branch mispredict. More particularly, information from branch prediction unit 112, and branch targets predicted and computed for direct, return, and indirect-not-return branches. Accordingly, the next fetch prediction unit 201 may be a fast access cache for the above predictors. In one embodiment, predictions by the next fetch prediction unit 201 may be verified by more accurate predictors such as the branch prediction unit 112.

The next fetch prediction unit 201 may also be configured to store, in each entry, an indication of whether or not the next fetch group includes another conditional branch instruction or an indirect branch instruction. Accordingly, a hit in the next fetch prediction unit 201 may produce as an output, a branch target and an enable/disable signal to the BDP array 212 and IBP array 213. As described further below, this enable/disable indication may be used to enable or disable the corresponding respective BDP and IBP array. It is noted that if the branch instruction in the next fetch group is an unconditional branch, the corresponding branch indication will not indicate a branch since unconditional branches do not need prediction.

In one embodiment, the sequential fetch prediction unit 203 may also include a storage array (not shown) having some number of entries. Each entry in the sequential fetch prediction unit 203 may store, among other things, an indication of whether or not another branch instruction or an indirect branch instruction is present within a particular sequential fetch group to be executed in the cycles following the taken branch instruction. As described further below, this indication may be used to enable or disable the corresponding respective BDP and IBP array.

In one embodiment, the sequential fetch prediction unit 203 is accessed using the same fetch address index that was used to access the next fetch prediction unit 201 such that there is a one-to-one correspondence between each entry in the next fetch prediction unit 201 and a respective entry in the sequential fetch prediction unit 203. In addition, in one embodiment, each entry in the sequential fetch prediction unit 203 may include a separate branch instruction indication for each fetch group that lies in the shadow of the taken branch instruction. Accordingly, in such an embodiment, the sequential fetch prediction unit 203 may provide a fixed number of branch instruction indications after a hit in the next fetch prediction unit 201 in a previous cycle. The fixed number corresponds to the number of fetch groups that follow the taken branch and each respective branch instruction indication will be used in each consecutive cycle after the taken branch. For example, in various implementations, each entry of the sequential fetch prediction unit 203 may store four, eight, or sixteen branch instruction indications. In another embodiment, each entry may store one branch instruction indication for all of the fetch groups in the shadow of the taken branch.

In one embodiment, the sequential fetch prediction unit 203 is only accessed if in the previous cycle, there was a hit in the next fetch prediction unit 201. Accordingly, in response to a hit in the current cycle within the next fetch prediction unit 201 the fetch prediction unit 113 may be configured to generate a multiplexer selection signal that selects the output of the next fetch prediction unit 201 to enable the array of either the BDP array 212 or the IBP array 213. In addition, if there was a hit in the previous cycle, the fetch prediction unit 113 may be configured to generate a multiplexer selection signal that selects the output of the sequential fetch prediction unit 203 to enable the array of either the BDP array 212 or the IBP array 213.

Figure 3:
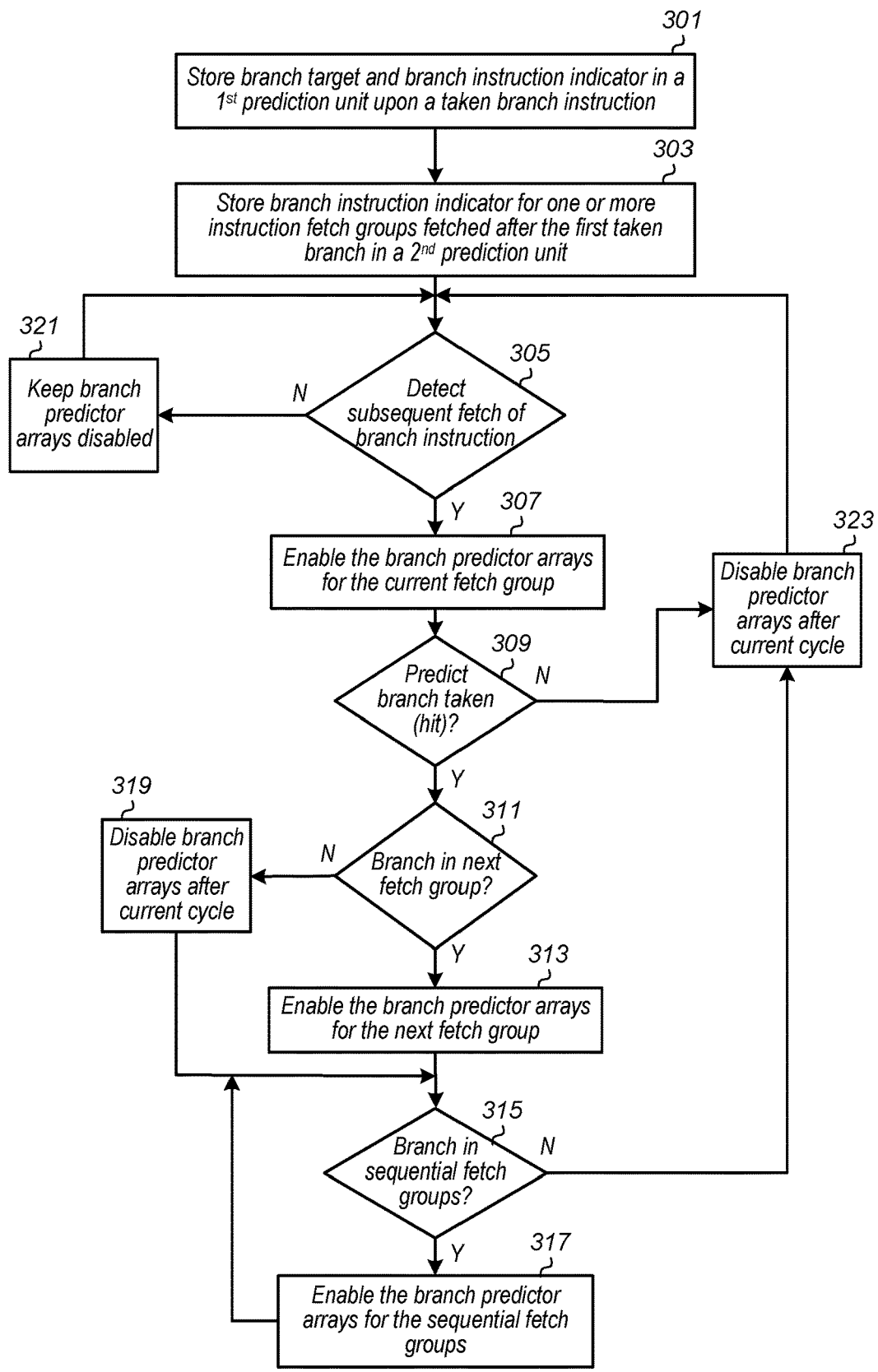
FIG. 3 is a flow diagram describing operational aspects of the processor of FIG. 1 and FIG. 2.

In FIG. 3, a flow diagram depicting operational aspects of the embodiments of the processor of FIG. 1 and FIG. 2 is shown. Referring collectively to FIG. 1 through FIG. 3, and beginning in block 301 of FIG. 3, during an initialization of the fetch and execution pipelines the fetch unit 101 begins fetching instructions. As each branch instruction is encountered, both the branch prediction unit 112 and the next fetch prediction unit 201 will predict taken/not taken. However, the prediction performed by the prediction unit 112 is typically very accurate and generally takes more than one cycle. The prediction performed by the next fetch prediction unit 201 is done in one cycle, and as such it is considered a fast access predictor as mentioned above.

As a first branch instruction is encountered, the branch prediction unit 112 arrays are enabled, and because the next fetch prediction unit 201 is empty it will predict not taken. If the branch prediction unit 112 agrees, then the fetch unit will continue to fetch instructions sequentially. If however, the branch prediction unit 112 predicts taken, then a mispredict occurs, and the pipeline may be flushed and the redirection process begins. During the redirect process, the instructions in each fetch group are refetched, and an entry is made in the next fetch prediction unit 201 that includes the target address of the branch, along with a branch instruction indicator. Upon the branch being taken, information such as cache way information, for example, and branch instruction indication corresponding to the instructions of the sequential fetch groups following the taken branch are stored within a corresponding entry the sequential fetch prediction unit 203. In one embodiment, the sequential fetch group way information will continue to be stored until either that entry of the sequential way prediction unit 203 fills, or another branch instruction is encountered. The branch instruction indication may be stored in the entry as described above (block 303).

Once the next fetch prediction unit 201 and the sequential fetch prediction unit 203 have been initialized, the BDP array 212 and IBP array 213 are kept disabled until a branch instruction fetch is detected (block 321). If a subsequent fetch of the branch instruction is detected (block 305), an index is generated based upon the fetch address of the branch instruction, and the BDP array 212 and IBP array 213 are enabled for the current fetch group (block 307). The index is used to access the next fetch prediction unit 201. If the index does not hit within the next fetch prediction unit 201 (block 309), it is considered a not taken prediction, and the fetch unit 101 continues to fetch instruction fetch groups sequentially and BDP array 212 and IBP array 213 may stay disabled (block 323). However, if the index hits within the next fetch prediction unit 201 (block 309), it is considered a taken prediction and the indexed entry provides the branch target information and the branch instruction indication for the next fetch group. If the branch instruction indication indicates that there is a conditional branch instruction in the next fetch group (block 311), the fetch prediction unit 113 may generate an enable signal to enable (or keep enabled) the BDP array 212 or the IBP array 213 through multiplexer 207 for the next execution cycle (block 313). It is noted that in one embodiment, one of the BDP array 212 and IBP array 213 may be enabled at a time dependent upon which type of branch instruction is fetched. However, referring back to block 311, if the branch instruction indication indicates that there is no conditional branch instruction in the next fetch group, the fetch prediction unit 113 may generate a disable signal to disable the BDP array 212 or the IBP array 213 after the current cycle (block 319).

Once the branch target information and the branch instruction indication is provided for the branch instruction, the sequential fetch prediction unit 203 is accessed based upon the fetch addresses of the next sequential instruction fetch groups. The branch instruction indication of the entry that is accessed is checked to determine if there is a conditional branch instruction in the sequential fetch groups (block 315). If the branch instruction indication indicates that there is a conditional branch instruction in the sequential fetch groups (block 315), the fetch prediction unit 113 may generate an enable signal to enable (or keep enabled) the BDP array 212 or the IBP array 213 through multiplexer 207 for the execution cycles corresponding to the sequential fetch groups having the branch instructions (block 317). If the branch instruction indication indicates that there is no conditional branch instruction in the sequential fetch groups (block 315), the fetch prediction unit 113 may generate a disable signal to disable the BDP array 212 or the IBP array 213 after the current cycle (block 323). It is noted that in one embodiment, if the branch prediction unit 112 produces a branch prediction that causes a mismatch between it and the next fetch prediction unit 201, the execution pipeline may be flushed and a redirect is initiated.

It is noted that although various operational aspects have been shown to occur in a particular sequence in FIG. 3, it is contemplated that in other embodiments operations may be omitted, other operations may be added, and/or the order of the operations may be different than that shown in FIG. 3.

Figure 4:
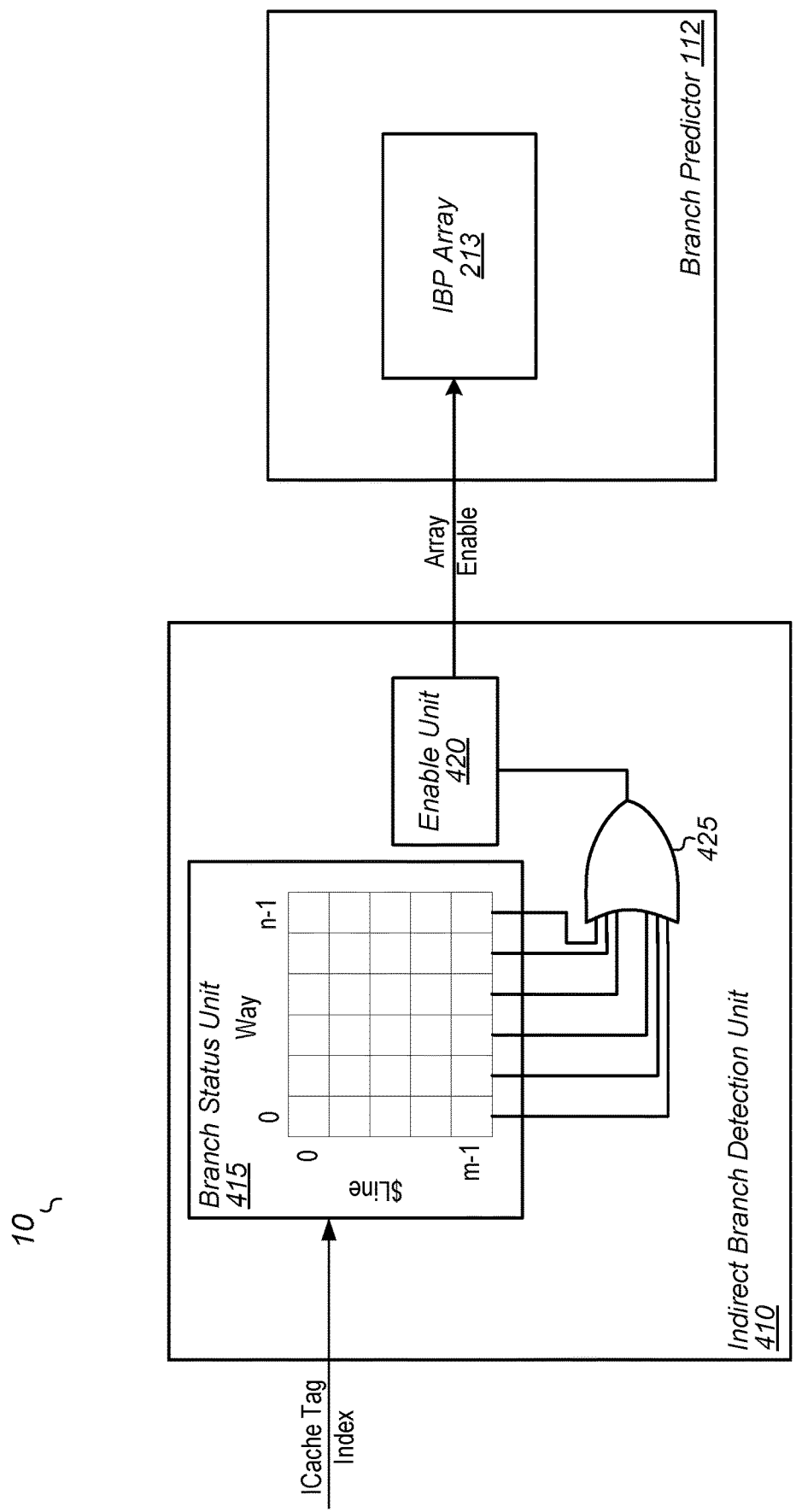
FIG. 4 is a block diagram illustrating more detailed aspects of another embodiment of the processor of FIG. 1.

Turning to FIG. 4, a block diagram illustrating more detailed aspects of another embodiment of the processor of FIG. 1 is shown. It is noted that components that correspond to those shown in FIG. 1 are numbered identically for clarity and simplicity. As shown in FIG. 4, an indirect branch detection unit 410, which includes a branch status unit 415 coupled to an OR function 425, which is in turn coupled to an enable unit 420. The indirect branch detection unit 410 is coupled to the indirect branch predictor (IBP) array 213 of the branch predictor 112.

In many cases, indirect branches occur infrequently. Accordingly, and similar to the branch direction predictor described above, in an effort to reduce processor power consumption it may not be necessary to keep the indirect branch predictor (IBP) array 213 of the branch predictor 112 enabled when there are no indirect branches being fetched.

In one embodiment, the branch status unit 415 includes a number of storage elements (e.g., flip-flops) that each store a single bit. The storage elements form an m by n array. Each element represents a cache line and way within the ICache 102. In one embodiment, if a bit is set it indicates that an indirect branch instruction is present in that cache line and in the particular way.

During the time a line is filled into the ICache 102, the predecoding operation may detect whether an indirect branch instruction is present in the cache line. If there is, the corresponding bit in the branch status unit 415 is set. During a fetch of a fetch group, the branch status unit 415 is checked to see if the fetch group includes an indirect branch and if so, the IBP array 213 may be enabled.

In various embodiments, the ICache tag array index and ICache way information may be used to access the branch status unit 415. In one specific implementation, during a first fetch stage, the ITLB 103 may be accessed to get the physical address for the ICache tag array lookup. The index that is generated may be used to access the cache line in the branch status unit 415. The outputs of all of the ways in the branch status unit 415 for the indexed cacheline may be OR'ed together in the OR function 425. In such a wire-OR configuration, if any of the ways of the cacheline have a set bit, then the enable unit 420 may generate an array enable signal to enable the indirect branch predictor (IBP) array 213. However, in other embodiments, the cache way may be determined during a lookup in the ICache tag array. The specific cache way in the branch status unit 415 may then be accessed, and the indication used to generate an array enable signal.

Instruction Cache and TLB Power Reduction

Referring to FIG. 5, a block diagram depicting more detailed aspects of another embodiment of the processor of FIG. 1 is shown. It is noted that components that correspond to those shown in FIG. 1 and FIG. 2 are numbered identically for clarity and simplicity. As shown in FIG. 5, the processor 10 includes a fetch prediction unit 513, which includes a next fetch prediction (NFP) unit 501, a cache status unit 510, both of which are coupled to a bypass unit 515. As described above, the processor 10 also includes an ITLB array 523 and ICache 102 which includes a tag array 521.

Similar to the embodiment described in in conjunction with the description of the NFP unit 201 of FIG. 2, the NFP unit 501 of FIG. 5 may be configured to perform simple branch direction and target prediction, and may operate similarly. Thus the NFP 501 may store branch target information as well as cache way information corresponding to the way in the ICache in which the target is stored.

As mentioned above, to reduce processor power consumption it may be possible to disable the ICache tag array 521 and the ITLB array 523 when they are not needed. More particularly, in some code loops once the ICache has been filled and the code loop has been executed, the instructions may all be in the ICache 102, and the translations may be done. In addition, since the NFP 501 may include branch instruction information and cache way information, it may be possible to disable or otherwise keep from using the ICache tag array 521 and the ITLB array 523 if it can be guaranteed that there has not been a cacheline fill for a cacheline that has previously hit in the NFP, and there has not been a translation update.

Accordingly, in one embodiment, the cache status unit 510 includes a cache status storage unit 511 and an NFP status storage unit 512. Each of the storage units includes a number of storage elements (e.g., flip-flops) that each store a single bit. The storage elements form an m by n array. Each element in cache status storage unit 511 represents a cache line and way within the ICache 102. In one embodiment, if a bit is set it indicates that there has been a hit in the corresponding cacheline and way and the cacheline has not had a cacheline fill since the last hit. In a similar way, each element in NFP status storage unit 512 represents an NFP entry and way in the NFP unit 501. In one embodiment, if a bit is set it indicates that the corresponding cacheline has hit in the ICache and the NFP has also hit on the cache line and way.

Accordingly, as described in greater detail below in conjunction with the description of FIG. 6, the cache status storage 511 keeps track of whether the cachelines have been filled or not, and the NFP status storage 512 ensures that a hit in the NFP may not cause an access to a cache line that has been filled. This is a secondary check due to the NFP 501 entries being indexed, and thus there exists a possibility of aliasing of cacheline entries. Thus, when there is a cacheline fill for any cacheline, the entire NFP status storage 512 is cleared, while only the bit in the cache status storage 511 corresponding to the cacheline and way is cleared.

Once the NFP unit 501 is trained, if there is an NFP hit, the branch target and way information may be fed to the tag array 521 and the ITLB array 523 through the PC Mux 517. Concurrent with the access of the NFP unit 501, the cache status unit 510 may also be accessed. If the bits corresponding to the cacheline and way in the cache status storage 511 and the NFP bit in the NFP status storage 512 are both set, the bypass unit 515 may inhibit the read enable signal to the ITLB array 523 and the tag array 521. In such a case, the target and way information from the NFP entry may be used to directly access the ICache array. In this way, the ITLB array 523 and the tag array 521 are not enabled and power is conserved.

Figure 6:
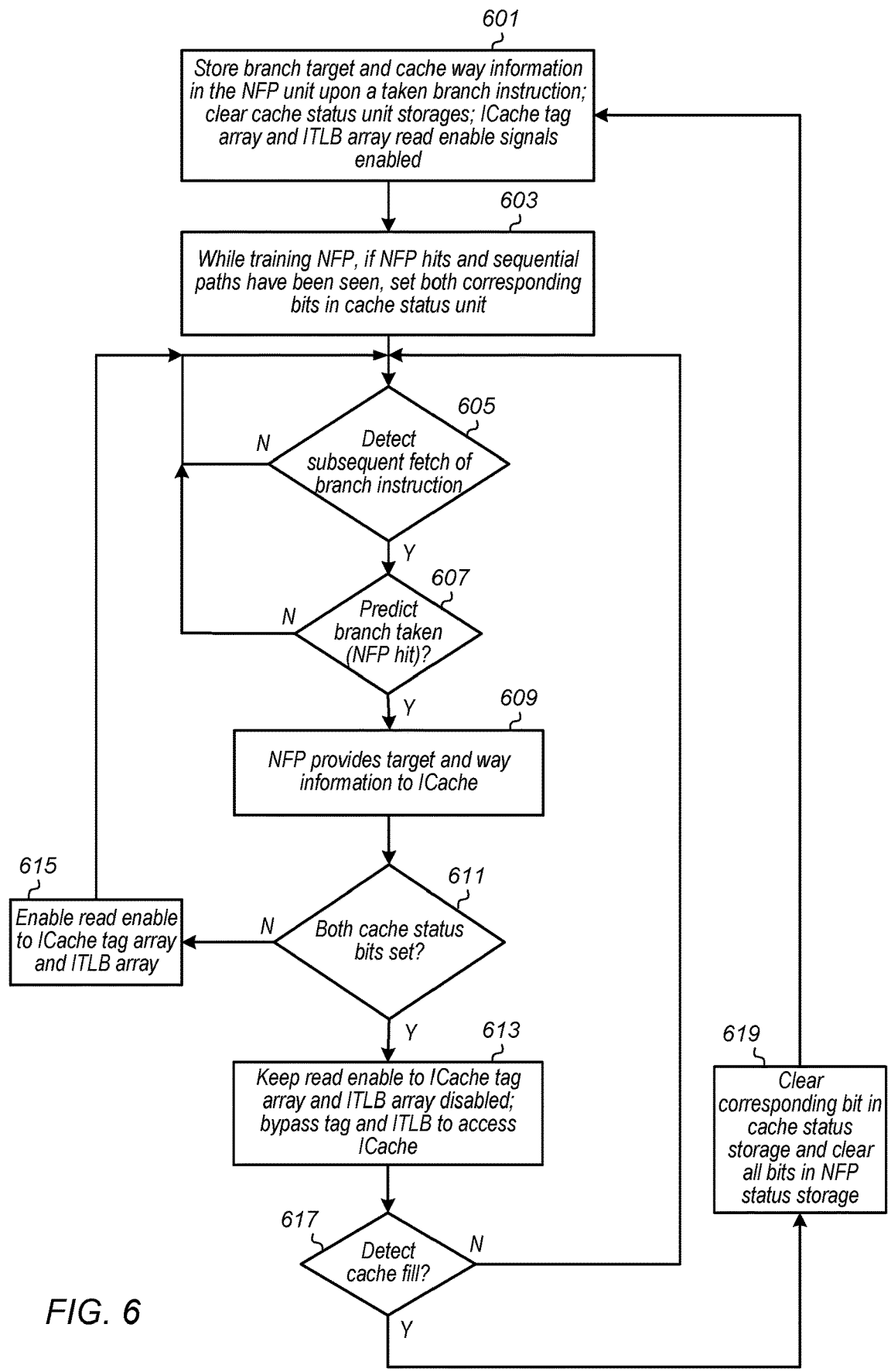
FIG. 6 is a flow diagram describing operational aspects of the processor and cache memory of FIG. 1 and FIG. 5.

FIG. 6 is a flow diagram depicting operational aspects of the embodiments of the processor of FIG. 1 and FIG. 5 is shown. Referring collectively to FIG. 1, FIG. 5, and FIG. 6, and beginning in block 601 of FIG. 6, during an initialization of the fetch and execution pipelines the fetch unit 101 begins fetching instructions. As each branch instruction is encountered, both the branch prediction unit 112 and the NFP unit 501 will predict taken/not taken. However, the prediction performed by the prediction unit 112 is typically very accurate and generally takes more than one cycle. The cache status storage 511 and NFP status storage 512 are cleared and initialized, and the read enabled signal to the ICache tag array 521 and the ITLB array 523 are enabled upon a read of those structures.

As a first branch instruction is encountered, the NFP unit 501 is empty and will thus predict not taken. If the branch prediction unit 112 agrees, then the fetch unit will continue to fetch instructions sequentially. If however, the branch prediction unit 112 predicts taken, then a mispredict occurs, and the pipeline may be flushed and the redirection process begins. During the redirect process, the instructions in each fetch group are refetched, and an entry is made in the NFP unit 501 that may include the target address of the branch, and cache way information, for example. During this NFP training sequence, and a NFP hit is registered on subsequent passes through the code loop, and the sequential paths are seen, the corresponding bit in each of cache status storage 511 and NFP status storage 512 are set (block 603).

Once the NFP unit 501 has been initialized, if a subsequent fetch of the branch instruction is detected (block 605), an index is generated based upon the fetch address of the branch instruction. The index is used to access the NFP unit 501. If the index does not hit within the NFP unit 501 (block 607), it is considered a not taken prediction, and the fetch unit 101 continues to fetch instruction fetch groups sequentially. However, if the index hits within the NFP unit 501 (block 607), it is considered a taken prediction and the indexed entry provides the branch target and way information for the next fetch group (block 607). On the next cycle, the cache status storage 511 and the NFP status storage 512 are checked to see if there have been any cache fills since the last hit (block 611). If one or both bits are not set, then the read enable is allowed to be enabled for accessing the ITLB array 523 and the tag array 521 (block 615). However, if both bits are set (block 615), the bypass unit 615 may inhibit the read enable signal and the branch target and way information from the NFP unit 501 may be used to access the ICache array 102 directly (block 613).

In addition, although not shown in FIG. 5, the fetch prediction unit 513 may also include a sequential fetch prediction unit such as one similar to the sequential fetch prediction unit 203 of FIG. 2. In this way, once there is a hit in the NFP unit 501 and a branch is predicted taken, this sequential fetch prediction unit may also be used to access the ICache array directly for as many sequential fetch groups as may be stored therein, or there is another NFP hit.

At any time, if a cache fill is detected (block 617), the bit which corresponds to the cacheline and way being filled in the cache status storage 511, and all the bits in the NFP status storage 512 are cleared (block 619) and the NFP status storage will need to be retrained as described above in block 601. Otherwise if no cacheline fill is detected (block 617), operation continues as described above in block 605.

Figure 7:
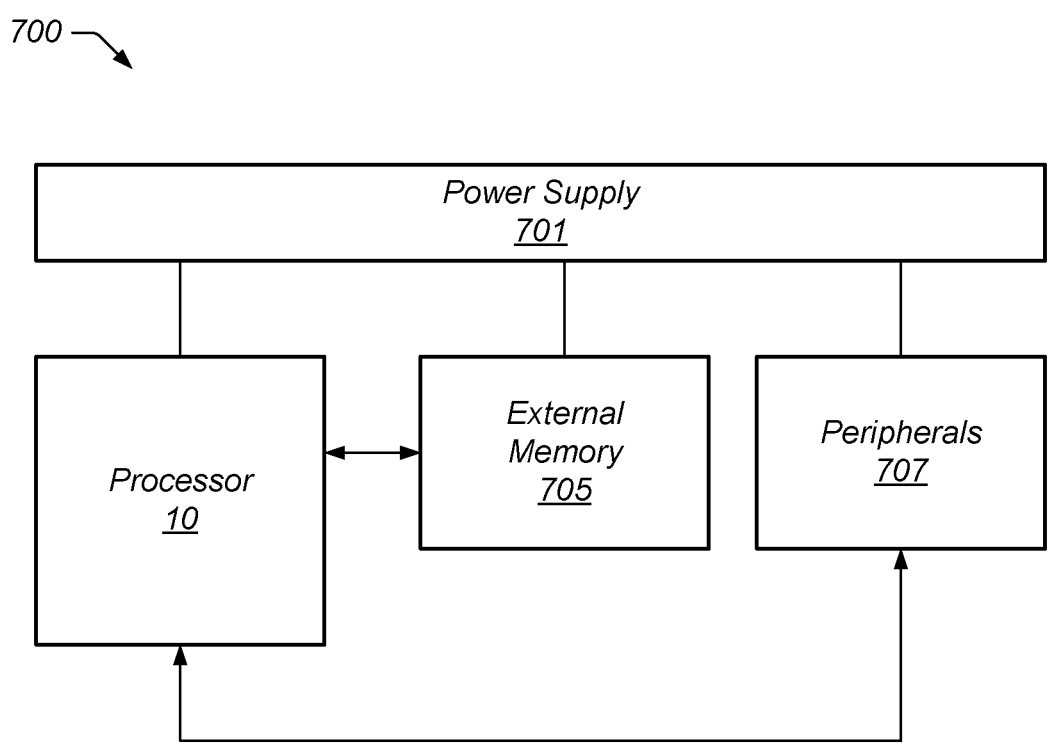
FIG. 7 is a block diagram of one embodiment of a system including the processor of FIG. 1, FIG. 2, FIG. 4, and FIG. 5.

Turning to FIG. 7, a block diagram of one embodiment of a system that includes the processor 10 of FIG. 1, FIG. 2, FIG. 4 and FIG. 5 is shown. The system 700 includes at least one instance of the processor 10 coupled to one or more peripherals 707 and an external system memory 705. The system 700 also includes a power supply 701 that may provide one or more supply voltages to the processor 10 as well as one or more supply voltages to the memory 705 and/or the peripherals 707. In some embodiments, more than one instance of the processor 10 may be included.

The peripherals 707 may include any desired circuitry, depending on the type of system. For example, in one embodiment, the system 700 may be included in a mobile device (e.g., personal digital assistant (PDA), smart phone, etc.) and the peripherals 707 may include devices for various types of wireless communication, such as WiFi, Bluetooth, cellular, global positioning system, etc. The peripherals 707 may also include additional storage, including RAM storage, solid-state storage, or disk storage. The peripherals 707 may include user interface devices such as a display screen, including touch display screens or multitouch display screens, keyboard or other input devices, microphones, speakers, etc. In other embodiments, the system 700 may be included in any type of computing system (e.g., desktop personal computer, laptop, tablet, workstation, net top, etc.).

The system memory 705 may include any type of memory. For example, the system memory 705 may be in the DRAM family such as synchronous DRAM (SDRAM), double data rate (DDR, DDR2, DDR3, etc.), or any low power version thereof. However, system memory 705 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a cache memory circuit having a cache tag array, the cache tag array configured to activate in response to an assertion of a read enable signal;
a next fetch prediction unit configured to, based on a prediction that a next instruction fetch group includes a branch instruction:
assert the read enable signal; and
send branch target information to the cache tag array; and
a cache status circuit configured to:
maintain, in a cache status storage unit, cache status information for respective entries in the cache memory circuit;
maintain, in a next fetch prediction status storage unit, prediction status information for respective entries in the next fetch prediction unit; and
based on the cache and prediction status information:
block the assertion of the read enable signal from the cache tag array; and
cause the branch target information to bypass the cache tag array and be sent to the cache memory circuit.

2. The apparatus of claim 1, further comprising an instruction translation lookaside buffer configured to:
  activate in response to an assertion of the read enable signal; and
  translate a logical address into a physical address;
  wherein the cache status circuit is further configured to, based on the cache status information and the prediction status information, block the assertion of the read enable signal from the instruction translation lookaside buffer.

3. The apparatus of claim 1, wherein to maintain the cache status information, the cache status circuit is configured to:
  receive an indication of a fetch address; and
  set an entry in the cache status storage unit to a value that indicates that a respective cache line, corresponding to the fetch address, has been hit.

4. The apparatus of claim 3, wherein to maintain the prediction status information, the cache status circuit is configured to set an entry in the next fetch prediction status storage unit to a value that indicates that a respective entry in the next fetch prediction unit has hit on the respective cache line that corresponds to the fetch address.

5. The apparatus of claim 4, wherein the cache status circuit is further configured to block the assertion of the read enable signal from the cache tag array in response to a determination that a respective entry in the cache status storage unit and in the next fetch prediction status storage unit, the respective entries corresponding to a particular fetch address, are set to the indicative values.

6. The apparatus of claim 1, wherein the next fetch prediction unit is further configured to send cache way information in addition to the branch target information to the cache tag array.

7. The apparatus of claim 6, further comprising a branch status circuit configured to:
  maintain indirect branch status information that indicates if respective cache lines in the cache memory circuit include an indirect branch instruction;
  receive the branch target information and the cache way information from the next fetch prediction unit; and
  enable an indirect branch prediction memory array in response to a determination that a corresponding cache line identified by the branch target information and the cache way information includes an indirect branch instruction.

8. A method comprising:
  detecting, by a next fetch prediction unit of a processor circuit, that a next instruction fetch group includes a branch instruction;
  predicting, by the next fetch prediction unit, that the included branch instruction will take a branch;
  asserting, by the next fetch prediction unit, an enable signal for a cache tag array of a cache memory circuit;
  sending, by the next fetch prediction unit, branch target information to the cache tag array;
  maintaining, in a cache status storage unit, cache status information for entries in the cache memory circuit;
  maintaining, in a next fetch prediction status storage unit, prediction status information for entries in the next fetch prediction unit; and
  based on the cache status information and the prediction status information:
    blocking, by a cache status circuit, the asserting of the enable signal from the cache tag array; and
    causing, by the cache status circuit, the branch target information to bypass the cache tag array and to be sent to the cache memory circuit.

9. The method of claim 8, further comprising blocking, by the cache status circuit based on the cache status information and the prediction status information, the asserting of the enable signal from reaching an instruction translation lookaside buffer.

10. The method of claim 8, wherein maintaining the cache status information for the entries in the cache memory circuit includes setting an entry in the cache status storage unit to a value that indicates that a particular cache line of the cache memory circuit has been hit.

11. The method of claim 10, wherein maintaining the prediction status information for the entries in the next fetch prediction unit includes setting an entry in the next fetch prediction status storage unit to a value that indicates that a respective entry in the next fetch prediction unit has hit on the particular cache line.

12. The method of claim 11, wherein the blocking, by the cache status circuit, the asserting of the enable signal from the cache tag array includes performing the blocking in response to determining that entries, corresponding to the branch target information, in the cache status storage unit and in the next fetch prediction status storage unit are set to the indicative values.

13. The method of claim 11, further comprising, in response to determining that the particular cache line of the cache memory circuit has been refilled:
  clearing the entry in the cache status storage unit that corresponds to the particular cache line; and
  clearing all entries in the next fetch prediction status storage unit.

14. The method of claim 8, further comprising storing, by the next fetch prediction unit in a respective entry in the next fetch prediction unit, branch target information and cache way information in response to detecting a taken branch instruction in a particular fetched cache line.

15. An apparatus comprising:
  an indirect branch prediction memory array configured to activate in response to an assertion of an enable signal; and
  a branch status circuit configured to:
    maintain respective cache status information for a plurality of cache ways in a cache memory circuit, wherein the cache status information includes an indication whether a respective cache line of a particular cache way includes an indirect branch instruction;
    receive a cache tag identifying a cache line;
    based on received cache tag information corresponding to a fetched cache line, determine whether any cache way associated with the fetched cache line includes an indirect branch instruction; and
    assert the enable signal in response to a determination that at least one cache way associated with the identified cache line is indicated to include an indirect branch instruction.

16. The apparatus of claim 15, wherein the branch status circuit is further configured to de-assert the enable signal in response to a determination that cache ways associated with a different fetched cache line identified by different cache tag information exclude an indirect branch instruction.

17. The apparatus of claim 15, wherein to maintain the cache status information, the branch status circuit includes an array of storage circuits, a particular storage circuit corresponding to a respective combination of a particular cache line and a particular cache way in the cache memory circuit.

18. The apparatus of claim 17, wherein the branch status circuit is further configured to set a particular one of the storage circuits to a value indicating that the respective combination of a corresponding cache line and a corresponding cache way in the cache memory circuit includes an indirect branch instruction.

19. The apparatus of claim 18, wherein to determine that at least one storage circuit corresponding to any cache way for the identified cache line is set to the indicative value, the branch status circuit includes at least one logic OR circuit configured to receive respective outputs from a plurality of storage circuits corresponding to the cache ways of the identified cache line.

20. The apparatus of claim 18, wherein the array of storage circuits include a respective flip-flop circuit, and the indicative value is a logic high.

* * * * *